United States Patent
Reinhold

(10) Patent No.: US 6,174,178 B1
(45) Date of Patent: Jan. 16, 2001

(54) RETRACTABLE CONNECTOR MECHANISM FOR SIGNAL CONNECTORS

(75) Inventor: Steve U. Reinhold, Hillsboro, OR (US)

(73) Assignee: Tektronix, Inc., Beaverton, OR (US)

( * ) Notice: Under 35 U.S.C. 154(b), the term of this patent shall be extended for 0 days.

(21) Appl. No.: 09/525,209

(22) Filed: Mar. 14, 2000

(51) Int. Cl.$^7$ .......................... H01R 13/44; H01R 13/60
(52) U.S. Cl. .............................................. 439/131
(58) Field of Search ............................................ 439/131

(56) References Cited

U.S. PATENT DOCUMENTS 4,986,762 * 1/1991 Keith ..................................... 439/131

* cited by examiner

Primary Examiner—Neil Abrams
Assistant Examiner—Javaid Nasri
(74) Attorney, Agent, or Firm—William K. Bucher

(57) ABSTRACT

A retractable connector mechanism for a signal connector has a recessed tub housing with a signal connector carrier rotatably fixed within the housing. The retractable connector mechanism rotates from the stored position in the housing to an angled positioned extending out of the housing. A biased carrier latch is attached to the signal connector carrier and is biased by a spring to rotate to a locked position. The biased carrier latch has a cam surface that travels on first and second guide surfaces within the housing such that rotating the signal connector carrier from the stored position to the angled position causes the cam surface to travel on the first guide surface and the biased carrier latch to rotate to a locked position on the second guide surface to latch the signal connector carrier in the angled position.

13 Claims, 3 Drawing Sheets

RETRACTABLE CONNECTOR MECHANISM FOR SIGNAL CONNECTORS

BACKGROUND OF THE INVENTION

The present invention relates generally to placement of signal connectors on measurement test instruments and more particularly to a retractable connector mechanism for signal connectors for field use measurement test instruments.

Measurement test instruments have various type of electrical and optical signal connectors for coupling test signals to the test instrument. Field use measurement test instruments require some type of protection for the signal connectors. Generally this entails recessing the connectors into the outer shell of the instrument so that if the instrument is dropped the connectors will not be damaged or destroyed. The TFS3031 Optical Time Domain Reflectometer (OTDR), manufactured and sold by Tektronix, Inc., Beaverton Oreg., has optical connectors that are recessed into the outer plastic shell of the instrument. The recess for the connectors are large enough for an operator to hand connect various optical adapters onto the optical connectors. The TV220 Metallic Time Domain Reflectometer Cable Tester, manufactured and sold by Tektronix, Inc., Beaverton Oreg., has a threaded RF connector extending from the side of the instrument. Bumper guards are molded into the top and bottom of the cable tester shell that extend outward from the sides past the RF connector to provide partial protection. The cable tester is provided with a heavy nylon carrying case that has protective padding disposed within the case to provide additional drop protection up to two meters.

Measurement test instrument manufacturers are developing smaller and lighter field test equipment for customer use. At the same time, customer requirements dictate that signal connector be accessible for easy manual connection without the use of tools. The smaller size of field test equipment limits the accessability of recessed signal connectors to manual connection. Extending the connectors past the shell of the instrument is possible, as in the TV200, but requires a specially padded carrying case. Such a carrying case adds cost to the instrument.

What is needed is a connector mechanism for signal connectors that protects the signal connectors during normal transportation and handling while at the same time provides easy access for connecting cables and adapters to without the use of tools.

SUMMARY OF THE INVENTION

Accordingly, the present inventions is to a retractable connector mechanism for a signal connector having a recessed tub housing. A signal connector carrier disposed within the recessed tub and rotatable from a first stored position to a second angled position extending outward from the housing. First and second guide surfaces are disposed within the housing adjacent to the signal connector carrier and a biased carrier latch is rotatably connected to the signal connector carrier that rotates from a first position to a second locked position. The biased carrier latch has a cam surface that travels on the first and second guide surfaces such that rotating the signal connector carrier from the stored position to the angled position causes the cam surface to travel on the first guide surface and the biased carrier latch to rotate to the second locked position on the second guide surface to latch the signal connector carrier in the angled position.

In the preferred embodiment of the invention, the recessed tube housing is an injected molded part having side and end walls and a base with the side walls being longer than the end walls forming a rectangular shaped recessed tub. The guide surfaces are integrally formed in the side walls of the recessed tub as part of the molding process with the first guide surface having a first radius of curvature and the second guide surface having a second radius of curvature. The sidewalls have apertures formed therein that receive a signal connector carrier pin which is inserted through a bore in one end of the signal connector carrier for securing the carrier to the housing. The recessed tub housing also has an aperture formed therein for receiving a signal cable. The signal connector carrier has a tab extending from the opposite end of the carrier from the pin bore that raises the carrier from the first stored position to the second angled position with upward pressure on the tab. The signal connector carrier further has a downward extending member positioned at the opposite end of the carrier from the pin bore with a bore formed there through that receives the signal connector which may be an electrical or optical connector. The recessed tube also has a stop tab disposed in at least one side wall for engaging the downward extending member of the signal connector carrier for impeding the upward rotational movement of the carrier. The biased carrier latch preferably has a biasing spring that rotates the carrier latch from the first position to the second position. The objects, advantages and novel features of the present invention are apparent from the following detailed description when read in conjunction with the appended claims and attached drawings.

DETAILED DESCRIPTION OF THE PREFERRED EMBODIMENT

Figure 1:
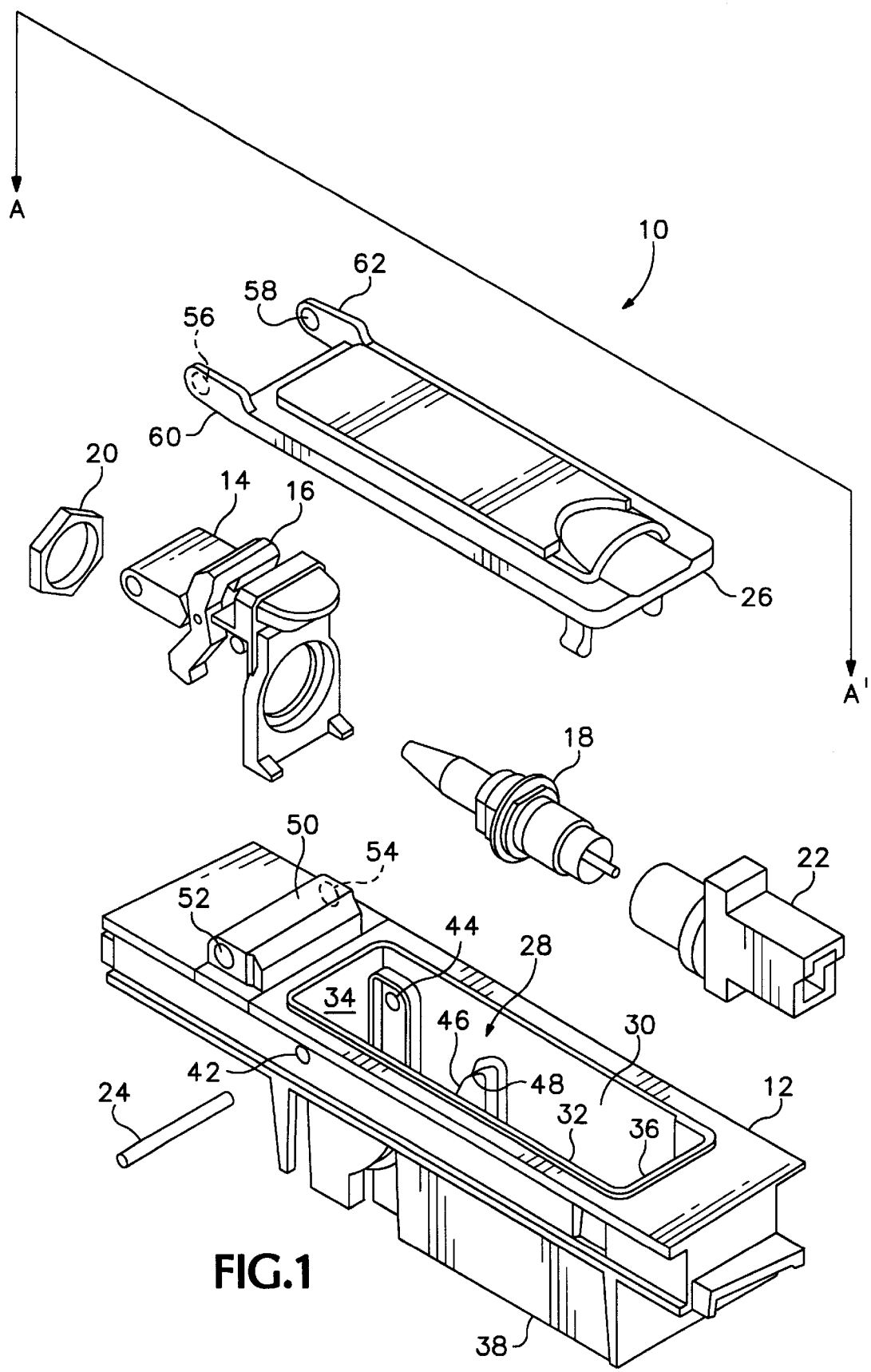
FIG. 1 is a partially exploded view of the retractable connector mechanism according to the present invention.

Referring to FIG. 1, there is shown a partially exploded perspective view of the retractable connector mechanism 10 for a signal connector according to the present invention. The retractable connector mechanism 10 has a housing 12 and a signal connector carrier 14 on which is rotatably connected a biased signal connector carrier latch 16. The signal connector carrier 14 receives a signal connector 18, such as an optical connector, a BNC type connector, a threaded RF connector, or the like. The signal connector 18 is secured in the carrier 14 using a threaded nut 20 or other similar types of securing means. Various type of adapters 22 may be connected to the signal connector 18. The signal connector carrier 14 is rotatably secured in the housing 12 by a mounting pin 24. A rotatable door 26 is secured to the housing 12 to protect the carrier 14 and signal connector 18 from contamination, such as dust and water infiltration.

The housing 12 has a recessed tub 28 formed therein that has opposing side walls 30, 32 and end walls 34, 36 and a base 38. In the preferred embodiment, the side walls 30, 32 are longer than the end walls 34, 36 forming a rectangular shaped tub. The side walls 30, 32 have aligned apertures 42, 44 formed therein that receive the carrier mounting pin 24.

Disposed within the tub housing 28 are first and second guide surfaces, respectively numbered 46, 48. In the preferred embodiment, the guide surfaces 46, 48 are integrally formed as part of the recessed tub housing 28. Alternately, the guide surfaces 46, 48 may be a separately formed part or multiple parts that is mounted in the tub housing 28 using well known mounting techniques, such as gluing, sonic welding, or the like. Mounted on the top surface of the housing is a raised door bushing 50 having apertures 52, 54 formed therein that receive opposed raised protrusions 56, 58 mounted on fingers 60, 62 extending from the rotatable door 26. The raised protrusion 56, 58 engage the apertures 52, 54 in the door bushing 50 that secures the door 26 to the housing 12.

In the preferred embodiment of the invention, the housing 12 is an plastic injected molded part that is made from a PC/ABS blend plastic, such as FR-100, manufactured and sold by Miles, Inc, Pittsburgh, Pa. The guide surfaces 46, 48 are formed in the recessed tub 28 as part of the injection molding process as well as the apertures 42, 44 for the carrier mounting pin 24. The raised door bushing 50 is also integrally formed on the housing 12 as part of the injection molding process.

Figure 2:
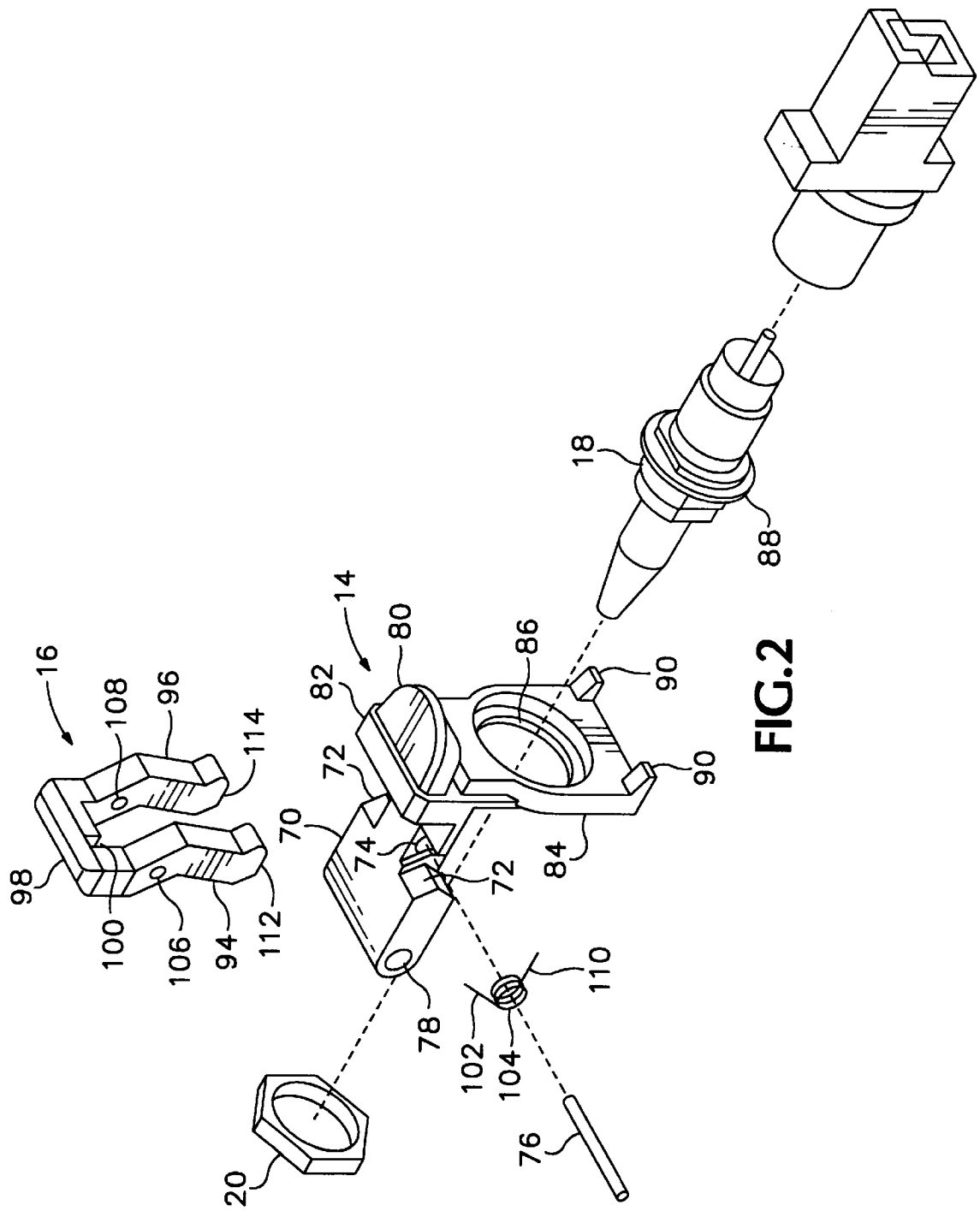
FIG. 2 is a perspective exploded view of the signal connector carrier and biased carrier latch retractable connector mechanism according to the present invention.

FIG. 2 is an exploded perspective view illustrating the signal connector carrier 14 and the biased carrier latch 16. The signal connector carrier 14 has a generally flat rectangular body 70 having recesses 72 formed part way along the body 70 for receiving the biased carrier latch 16. A bore 74 is formed in the body at the recesses 72 for receiving a carrier latch pin 76. At one end of the rectangular body, a bore 78 is formed through the body 70 that receives the carrier mounting pin 24. At the opposite end of the rectangular body 70, a tab 80 extends outward from the body that is mounted on a raised vertical strut 82 extending upward from the body 70. A signal connector mounting member 84 extends downward from the rectangular body 70 below the tab 80. The signal connector mounting member 84 has a bore 86 there through for receiving the signal connector 18. The signal connector 18 is configured with a flange 88 that engages one side of the mounting member 84 and a threaded nut 20 is screwed onto corresponding threads on the signal connector 18 and engages the opposite side of the mounting member 84 to secure the signal connector 18 in the mounting member 84. Disposed at the bottom of the signal connector mounting member 84 is a least one protrusion 90 for engaging a stop tab 92 disposed in at least one of the side walls 30, 32 of the recessed tub housing 28.

The biased carrier latch 16 is an approximate U-shaped member having parallel arms 94, 96 extending from a cross member 98. The cross member 98 has a notched 100 formed therein that receives a first spring arm 102 of a biasing spring 104. The carrier 14 has a counterbore channel (not shown) extending from the bore 74 that receives a second spring arm 110. Apertures 106, 108 are formed in each arm 94, 96 that are aligned to receive the carrier latch pin 76 that secures the biased carrier latch 16 to the signal connector carrier 14. The carrier latch pin 76 is inserted through the biasing spring 104 and is captured between one of the spring arms 94, 96 and the carrier 14. The biasing springs 104 provides a counter clockwise biasing pressure on the carrier latch 16. Cam surfaces 112, 114 are formed on the bottom of each arm 94, 96 that ride on the guide surfaces 46, 48. In the preferred embodiment, the signal connector carrier 14 and the biased carrier latch 16 are formed of aluminum 380, such as manufactured and sold by Custom Alloy Light Metals, City of Industry, Calif., The carrier mounting pin 24 and the carrier latch pin 76 are preferably made of stainless steel.

Figure 3:
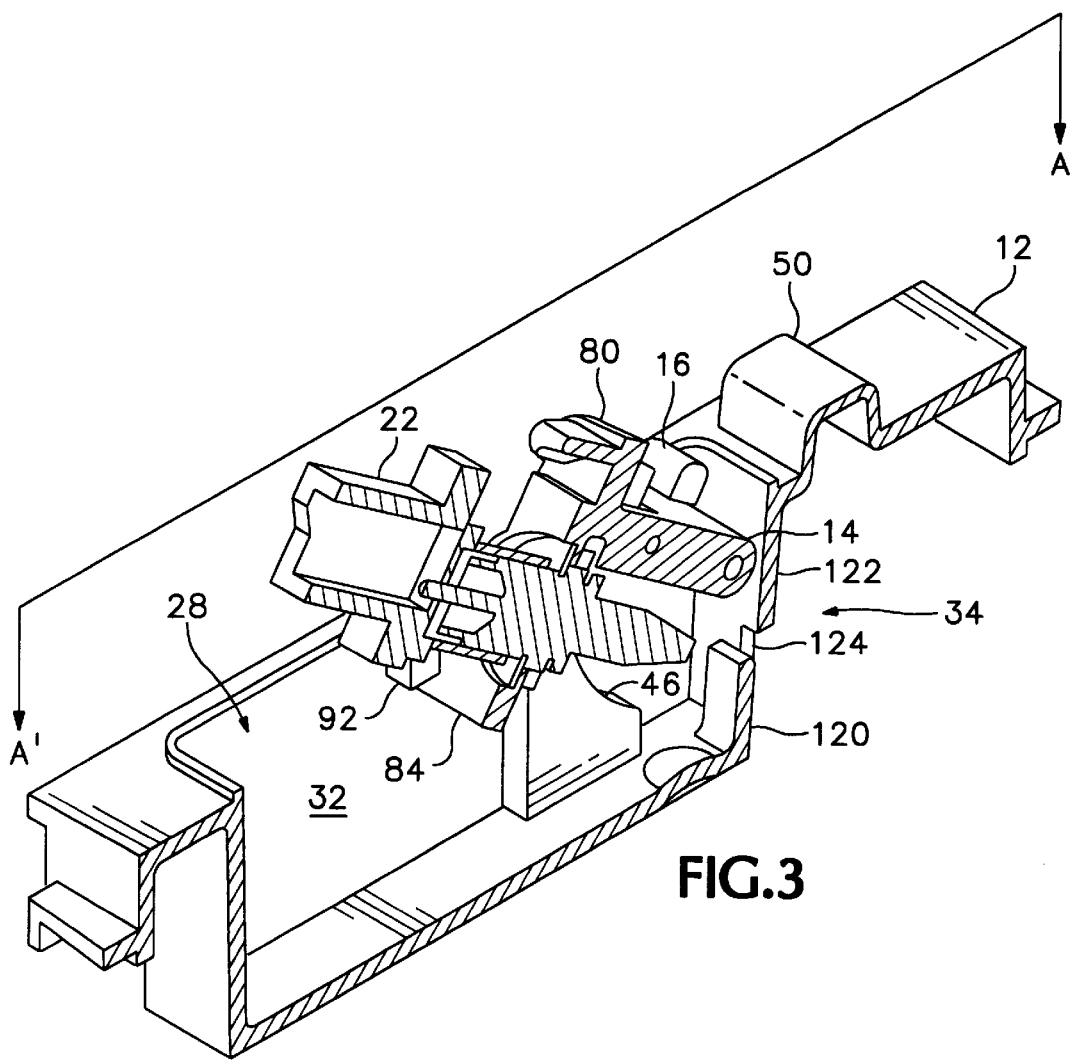
FIG. 3 is a perspective cross-sectional view along sectional line A–A' of the retractable connector mechanism according to the present invention.

FIG. 3 is a perspective cross-sectional view along sectional line A–A' of the retractable connector mechanism. Elements in FIG. 3 that are the same as in the previous figures are labeled the same. The end wall 34 closest to the signal connector carrier 14 is formed with overlapping top and bottom portions 120, 122 that allow a beveled aperture 124 to be formed in the end wall 34. The beveled aperture 124 receives a signal cable connected to the signal connector 18. Alternately, the end wall 34 may be formed as a continuous wall and the aperture 124 is formed in the wall by drilling. In such an aperture forming process, the aperture 124 would need to be beveled to remove any sharp edges around the hole.

Figure 4:
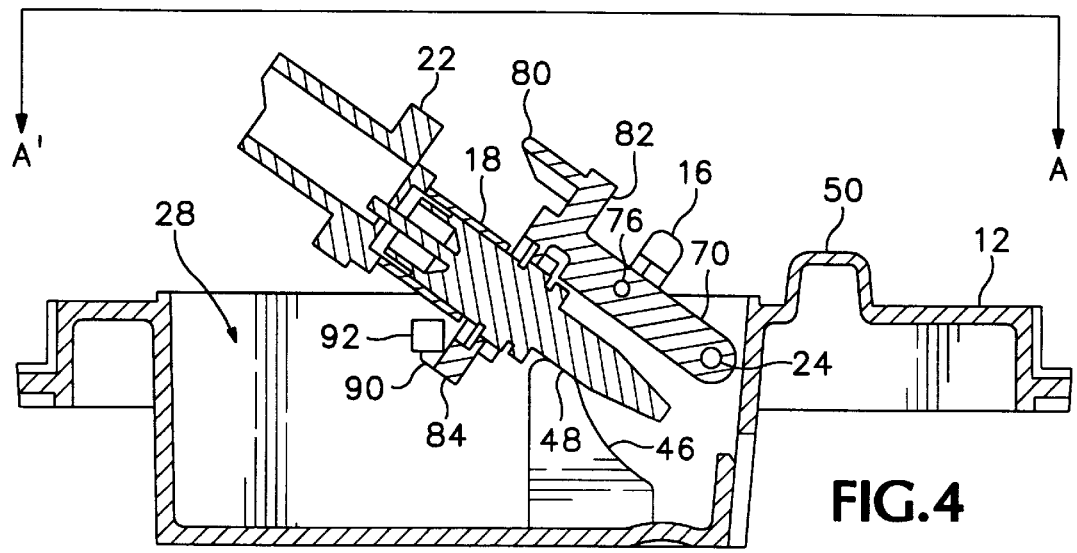
FIG. 4 is a planar cross-sectional view along sectional line A–A' of the retractable connector mechanism according to the present invention.

FIG. 4 is a planar cross-sectional view along sectional line A–A' of the retractable connector mechanism 10. The signal connector carrier 14 is shown in an angled raised second position where adapters 22 may be placed in the signal connector 18. The biased carrier latch 16 is used to release the carrier 14 to allow it to assume a first horizontal stored position within the recessed tub housing 28. First and second guide surfaces 46, 48 are clearly shown in the figure. The first guide surface 46 has a first radius of curvature about the carrier mounting pin 24. The second guide surface 48 has a second radius of curvature about the carrier latch pin 76 when in the second raised position. When in use, the carrier 14 is raised from the stored position by upward pressure on the tab 80 of the carrier 14. The cam surfaces 112, 114 of the biased carrier latch 16 ride on the first guide surface 46 to the second guide surface 48. When the cams 112,114 reach the second guide surface 48, the bias on the latch 16 from the biasing spring 104 causes the latch 16 to rotate clockwise from a first position on the first guide surface 46 to a second position on the second guide surface 48. This spring biased rotational movement prevents the latch 16 from moving back to the first guide surface 46. One or both of the protrusions 90 on the lower end of the signal connector mounting member 84 engages the stop tab or tabs 92 in the side wall or walls 30, 32 to prevent further upward movement of the carrier 14. In the preferred embodiment of the invention, there is a single stop tab 92 that is integrally formed in one of the side walls 32 as part of the injection molding process. The cam surfaces 112, 114 of the carrier latch 16 resting on the second guide surfaces 48 and the protrusion 90 on the connector mounting member 84 engaging the stop tab 92 locks the signal connector carrier 14 in the angled position. The cross member 98 of the biased carrier latch 16 is moved toward the carrier tab 80 which causes the carrier latch cams 112, 114 to disengage from the second guide surface 48. The carrier latch cams 112, 114 travel along the first guide surface 46 which lowers the carrier 14 to the stored first position.

A retractable connector mechanism for a signal connector has been described having a recessed tub housing with a signal connector carrier rotatably fixed within the housing. The retractable connector mechanism rotates from the stored position in the housing to an angled positioned extending out of the housing. A biased carrier latch is attached to the signal connector carrier and is biased by a spring to rotate to a locked position. The biased carrier latch has a cam surface that travels on first and second guide surfaces within the housing such that rotating the signal connector carrier from the stored position to the angled position causes the cam surface to travel on the first guide surface and the biased carrier latch to rotate to a locked position on the second guide surface to latch the signal connector carrier in the angled position.

Thus, a retractable connector mechanism has been described. Whereas many alteration and modifications to the present invention will be comprehended by a person skilled in the art after having read the foregoing description, it is to be understood that the particular embodiments shown and described by way of illustration are in no way intended to be considered limiting. References to details of particular embodiments are not intended to limit the scope of the appended claims.

What is claimed is:

1. A retractable connector mechanism for a signal connector comprising:

a housing having a recessed tub;

a signal connector carrier disposed within the recessed tub and rotatable from a first position to a second position;

first and second guide surfaces disposed within the housing adjacent to the signal connector carrier; and a biased carrier latch rotatably connected to the signal connector carrier that rotates from a first position to a second position and having a cam surface that travels on the first and second guide surfaces such that rotating the signal connector carrier from the first position to the second position causes the cam surface to travel on the first guide surface and the biased carrier latch to rotate to the second position on the second guide surface to latch the signal connector carrier in the second position.

2. The retractable connector mechanism as recited in claim 1 wherein the recessed tub of the housing further comprises side and end walls and a base with the side walls being longer than the end walls forming a rectangular shaped recessed tub.

3. The retractable connector mechanism as recited in claim 2 wherein side walls of recessed tub have apertures formed therein for receiving a signal connector carrier pin.

4. The retractable connector mechanism as recited in claim 3 wherein the signal connector carrier has a bore there through at one end of the carrier for receiving the carrier pin that secures the signal connector carrier in the recessed tub.

5. The retractable connector mechanism as recited in claim 4 wherein the signal connector carrier has a tab extending from the opposite end of the carrier from the pin bore that raises the carrier from the first position to the second position with upward pressure on the tab.

6. The retractable connector mechanism as recited in claim 4 wherein the signal connector carrier further comprises a downward extending member positioned at the opposite end of the carrier from the pin bore and having bore formed there through that receives the signal connector.

7. The retractable connector mechanism as recited in claim 6 wherein the recessed tub further comprises a stop tab disposed in at least one side wall for engaging the downward extending member of the signal connector carrier for impeding the upward rotational movement of the carrier.

8. The retractable connector mechanism as recited in claim 2 wherein the housing is an injected molded part and the guide surfaces are integrally formed in the side walls of the recessed tub.

9. The retractable connector mechanism as recited in claim 2 wherein the one of the end walls of the recessed tub has an aperture formed therein for receiving a signal cable.

10. The retractable connector mechanism as recited in claim 1 wherein the first guide surface has a first radius of curvature and the second guide surface has a second radius of curvature.

11. The retractable connector mechanism as recited in claim 1 wherein the biased carrier latch further comprises a biasing spring that rotates the carrier latch from the first position to the second position.

12. The retractable connector mechanism as recited in claim 1 wherein the signal connector comprises an optical connector.

13. The retractable connector mechanism as recited in claim 1 wherein the signal connector comprises an electrical connector.

* * * * *